(12) United States Patent
Qiao et al.

(10) Patent No.: US 7,644,622 B2
(45) Date of Patent: Jan. 12, 2010

(54) MICRO-ELECTRO-MECHANICAL PRESSURE SENSOR

(75) Inventors: Dong-Hai Qiao, Shenzhen (CN); Yuan Yao, Shenzhen (CN); Kai-Li Jiang, Beijing (CN); Liang Liu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 143 days.

(21) Appl. No.: 12/038,988

(22) Filed: Feb. 28, 2008

(65) Prior Publication Data

US 2009/0013792 A1   Jan. 15, 2009

(30) Foreign Application Priority Data

Jul. 13, 2007   (CN) .................. 2007 1 0076041

(51) Int. Cl.
*G01L 9/00* (2006.01)
(52) U.S. Cl. .......................... 73/723; 73/702
(58) Field of Classification Search ............ None
See application file for complete search history.

(56) References Cited

U.S. PATENT DOCUMENTS 6,140,689 A    10/2000   Scheiter et al.
6,756,795 B2 *  6/2004   Hunt et al. .................. 324/701
6,803,840 B2 * 10/2004   Hunt et al. .................. 333/186
2006/0006377 A1 *  1/2006   Golovchenko et al. ........ 257/39
2007/0045756 A1 *  3/2007   Chang et al. ................ 257/414
2008/0314149 A1 * 12/2008   Rueger ........................ 73/579

FOREIGN PATENT DOCUMENTS

WO    2004/065926    8/2004

\* cited by examiner

*Primary Examiner*—Lisa M Caputo
*Assistant Examiner*—Jermaine Jenkins
(74) *Attorney, Agent, or Firm*—Andrew C. Cheng

(57) ABSTRACT

The present micro-electro-mechanical pressure sensor includes a substrate, a dielectric isolation layer, at least two electrodes, and a vibrating membrane. The substrate includes an acoustic cavity. The dielectric isolation layer is formed on the substrate, and the dielectric isolation layer includes a through hole corresponding to the acoustic cavity. The at least two electrodes are separately formed on the dielectric isolation layer. The vibrating membrane covers the through hole, and the vibrating membrane includes at least one carbon nanotube structure with two opposite ends. The two opposite ends of the carbon nanotube are respectively connected to at least a given one of the at least two electrodes.

20 Claims, 8 Drawing Sheets

MICRO-ELECTRO-MECHANICAL PRESSURE SENSOR

BACKGROUND

1. Field of the Invention

The invention generally relates to devices of micro-electro-mechanical systems, and, particularly, to a micro-electro-mechanical pressure sensor.

2. Discussion of Related Art

A micro-electro-mechanical pressure sensor generally includes a sensing part and an application specific integrated circuit (ASIC) part. The sensing part has a vibrating membrane, which vibrates to sound. However, a voltage-loading capability of the sensing part is very small. Thus, the sensing part usually connects with an amplifier, which is used to provide high resistance input and low noise. This makes circuits of the micro-electro-mechanical (i.e., MEM) pressure sensor complicated, thereby adding to the cost thereof.

One prerequisite for this vibrating membrane is that it be as sensitive as possible. One useful method is to improve a compliance degree of the vibrating membrane. Carbon nanotubes have very good mechanical properties and piezoresistive characteristics, especially in thin films embedded with arrays of such carbon nanotubes, and thin films of this nature are capable of being very thin. As such, the compliance degree of such a thin film is particularly suited for forming vibrating membranes. But so far, carbon nanotubes have not been exploited for use in micro-electro-mechanical pressure sensors.

What is needed, therefore, is a micro-electro-mechanical pressure sensor, which has a vibrating membrane containing carbon nanotube structures.

SUMMARY

A micro-electro-mechanical pressure sensor includes a substrate, a dielectric isolation layer, at least two electrodes, and a vibrating membrane. The substrate includes an acoustic cavity. The dielectric isolation layer is formed on the substrate and includes a through hole corresponding to the acoustic cavity. The at least two electrodes are separately formed on the dielectric isolation layer. The vibrating membrane covers the through hole, and the vibrating membrane includes at least one carbon nanotube structure with two opposite ends. The two opposite ends of the carbon nanotube are respectively connected to the at least two electrodes.

Other advantages and novel features of the present micro-electro-mechanical pressure sensor will become more apparent from the following detailed description of present embodiments, when taken in conjunction with the accompanying drawings.

BRIEF DESCRIPTION OF THE DRAWINGS

Many aspects of the present micro-electro-mechanical pressure sensor can be better understood with reference to the following drawings. The components in the drawings are not necessarily to scale, the emphasis instead being placed upon clearly illustrating the principles of the present micro-electro-mechanical pressure sensor.

Figure 1:
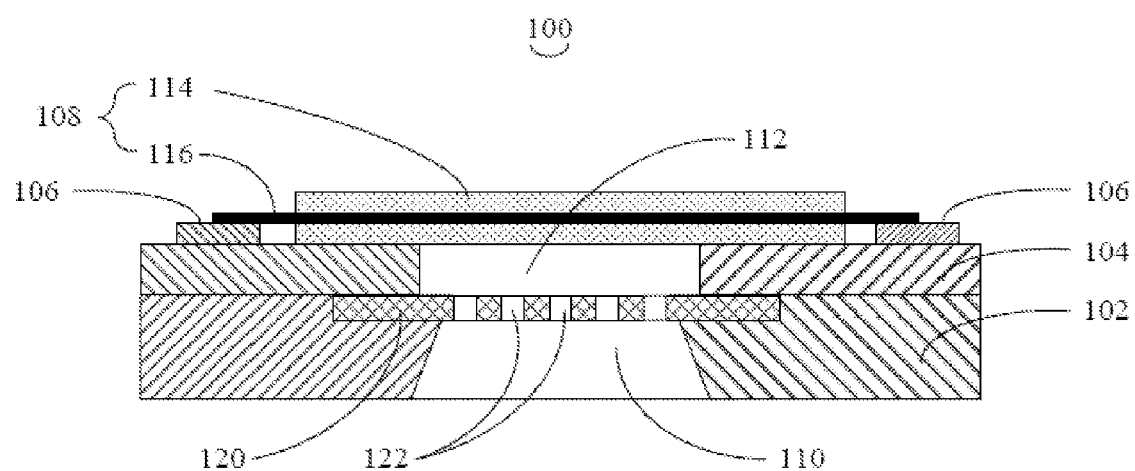
FIG. 1 shows a sectional schematic view of a micro-electro-mechanical pressure sensor, in accordance with the first present embodiment.

Corresponding reference characters indicate corresponding parts throughout the several views. The exemplifications set out herein illustrate at least one present embodiment of the micro-electro-mechanical pressure sensor, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the micro-electro-mechanical (MEM) pressure sensor, hereinafter referred to as a pressure sensor.

Figure 2:
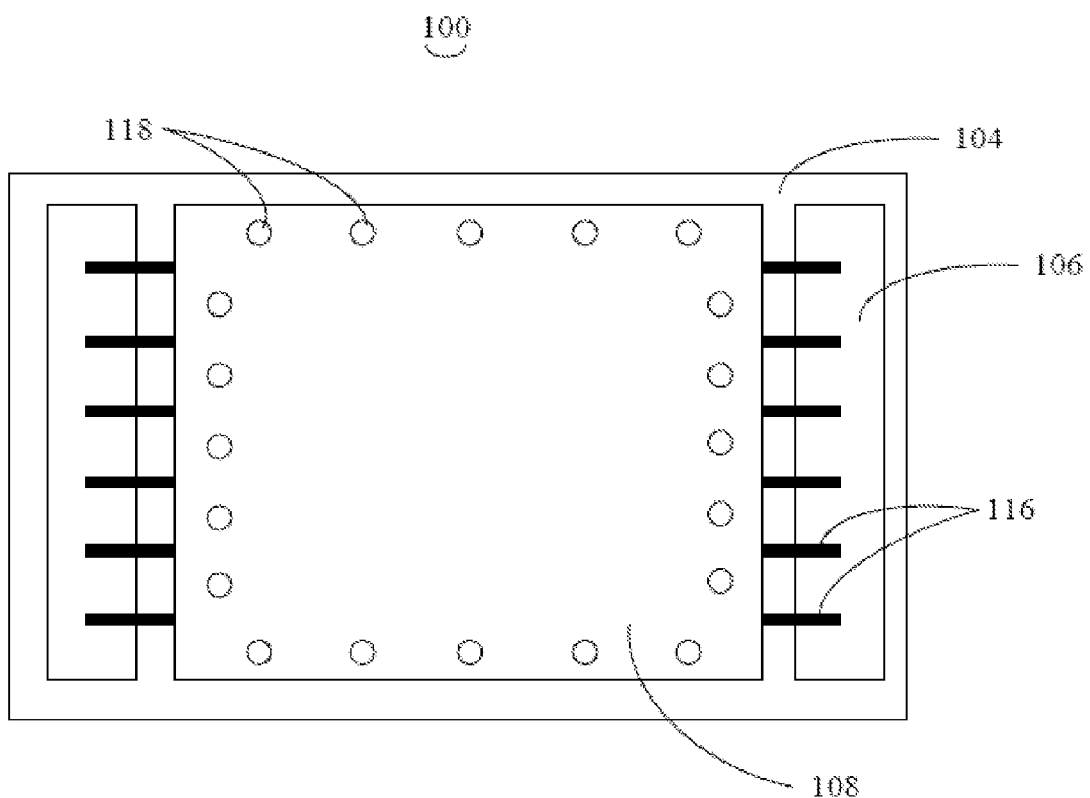
FIG. 2 is a top view of the micro-electro-mechanical pressure sensor shown in FIG. 1.

Referring to FIGS. 1 and 2, a pressure sensor 100 is provided in the first embodiment. The pressure sensor 100 includes a substrate 102, a dielectric isolation layer 104, two electrodes 106, and a vibrating membrane 108. The dielectric isolation layer 104 is formed on the substrate 102. The electrodes 106 and the vibrating membrane 108 are disposed on the dielectric isolation layer 104.

The substrate 102 is composed, at least, of one or more semiconductor materials. A material of the substrate is selected from a group consisting of doped n-type silicon, p-type silicon, and intrinsic silicon. Further, an acoustic cavity 110 is formed by etching on a backside of the substrate 102. The acoustic cavity 110 is configured for enhancing the sensitivity of the pressure sensor 100.

The dielectric isolation layer 104 includes a through hole 112. The through hole 112 is disposed so as to coincide/align with the acoustic cavity 110. Quite usefully, the material of the dielectric isolation layer 104 is selected from a group consisting of silicon dioxide and silicon nitride. A thickness of the dielectric isolation layer 104 is in an approximate range from 2 micrometers to 10 micrometers. Understandably, the dielectric isolation layer 104 is used to separate the electrodes 106 and the vibrating membrane 108 from the substrate 102.

The vibrating membrane 108 is formed on the dielectric isolation layer 104 and covers the through hole 112. The vibrating membrane 108 includes two organic films 114 and a plurality of carbon nanotube structures 116. In the first present embodiment, each of the carbon nanotube structures 116 is a carbon nanotube. The material of the organic films 114 is selected from a group consisting of Dichloro-[2,2]-paracyclophane (Parylene C) and polyamide. The two organic films 114 sandwich the carbon nanotube structures 116 therebetween, and the carbon nanotube structures 116 are separately disposed in parallel on a same plane. Changes of pressure on the vibrating membrane 108 cause deformation of the carbon nanotube structures 116 along an axis of the carbon nanotube structures 116, thereby causing changes of resistance therein. The changes of resistance are detected by an external circuit, which is connected to the carbon nanotube structures 116. As such, mechanical deformation of the vibrating membrane 108 is changed into electrical signals. The electrical signals are output by the external circuit.

The two electrodes 106 are separately formed on a surface of the dielectric isolation layer 104. The electrodes 106 are strip-shaped and connected to the carbon nanotube structures 116. Understandably, two opposite ends of the carbon nanotube structures 116 are respectively connected with the two electrodes 106, thereby forming a parallel electrical circuit.

Further, a plurality of holes 118 are disposed in the vibrating membrane 108, in order to overcome static pressure exerted by the ambient air. The pressure sensor 100 further includes a backboard 120, which is configured for being sandwiched between the substrate 102 and the dielectric isolation layer 104. A plurality of acoustic holes 122 are disposed on the backboard 120 communicating the through hole 112 with the acoustic cavity 110. The material of the backboard 120 generally is doped silicon, such as boron-doped silicon. The backboard 120 is used to provide acoustic damping. This allows the pressure sensor 100 to obtain a smooth frequency response over a wide frequency range.

Figure 3:
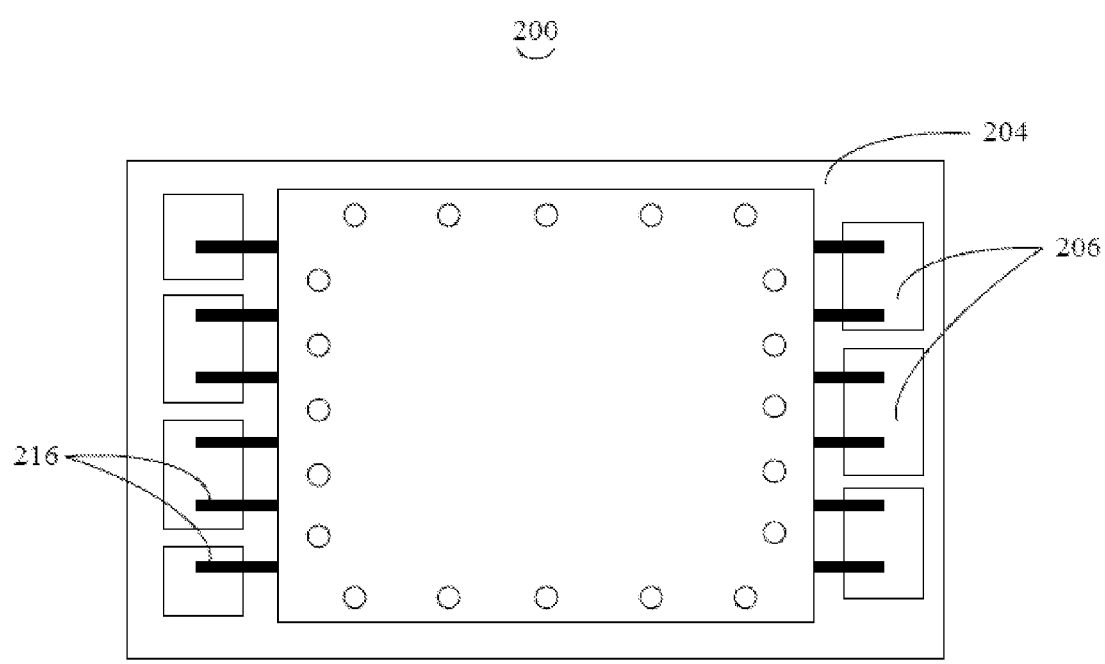
FIG. 3 is a top view of another micro-electro-mechanical pressure sensor, in accordance with a second present embodiment.

Referring to FIG. 3, a pressure sensor 200 is provided in a second present embodiment. The pressure sensor 200 is similar to the pressure sensor 100 in the first embodiment. But, the pressure sensor 200 includes a plurality of electrodes 206 formed on a dielectric isolation layer 204. Specifically, the electrodes 206 are separately disposed at opposite ends of the dielectric isolation layer 204. Opposite ends of each of a plurality of carbon nanotube structures 216 are electrically connected, respectively, to the electrodes 206 of each end of the dielectric isolation layer 204. Specifically, the electrodes 206 and the carbon nanotube structures are connected in a daisy-chain fashion to form a series circuit.

Figure 4:
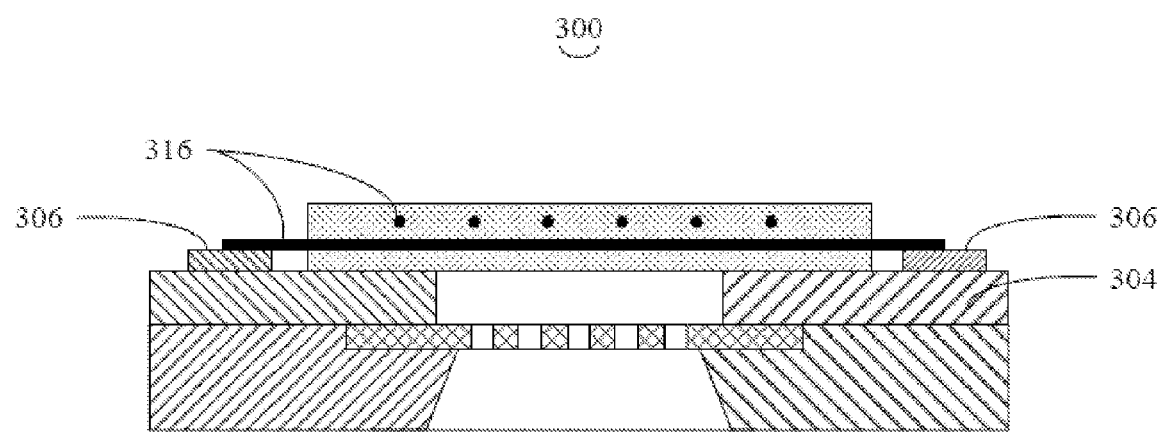
FIG. 4 is a sectional schematic view of a micro-electro-mechanical pressure sensor, in accordance with a third present embodiment.
Figure 5:
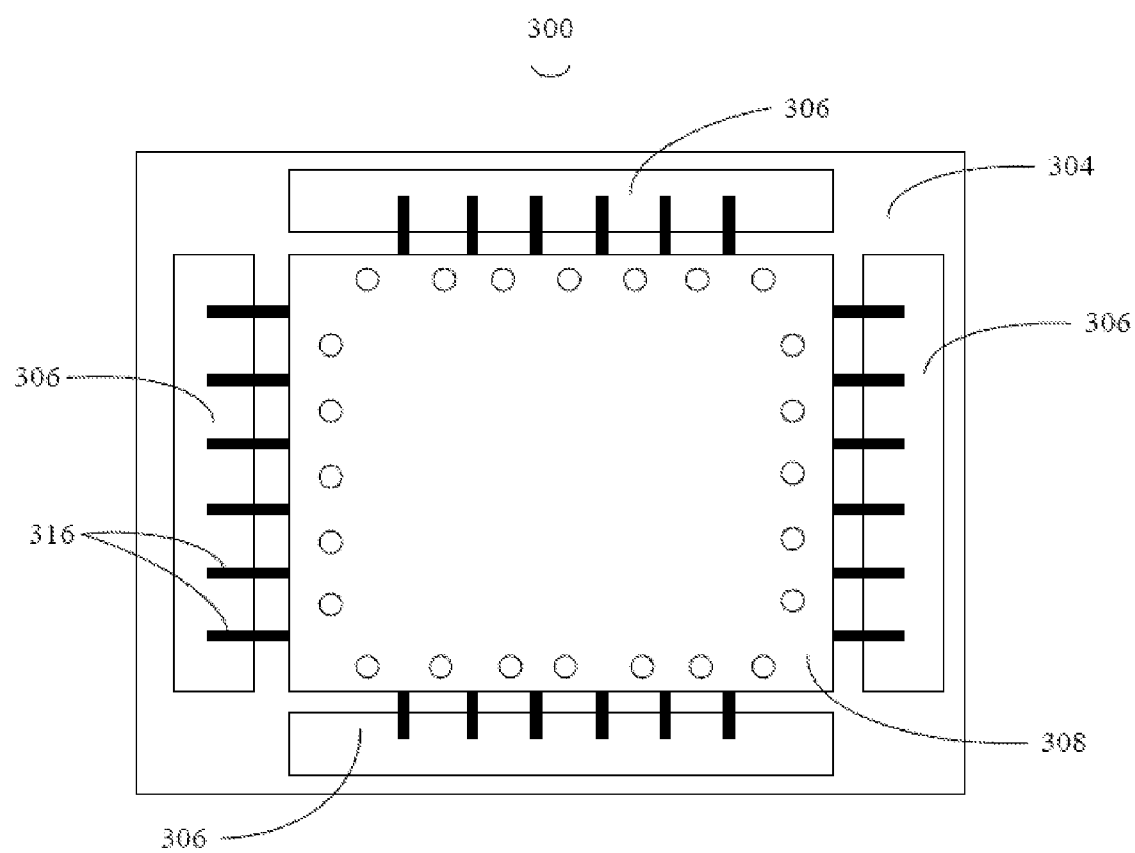
FIG. 5 is a top view of the micro-electro-mechanical pressure sensor shown in FIG. 4.

Referring to FIGS. 4 and 5, a pressure sensor 300 is provided in the third present embodiment. The pressure sensor 300 is similar to the pressure sensor 100 in the first present embodiment. However, the pressure sensor 300 includes a plurality of carbon nanotube structures 316 and four electrodes 306. The carbon nanotube structures 316 and the electrodes 306 are formed on the dielectric isolation layer 304. The carbon nanotube structures 316 are separately arranged in parallel, thereby forming a first carbon nanotube layer and a second carbon nanotube layer stacked above and insulated from the first carbon nanotube layer. The carbon nanotube structures 316 in each of the carbon nanotube layers are arranged in one direction. The carbon nanotube layers are configured with an angle $\alpha$, with $\alpha$ being the angle between the two arranged directions. In the present embodiment, the angle $\alpha$ is about 90 degrees. It is, however, to be understood that the angle $\alpha$ can, advantageously, be in the approximate range from 0° to 90°. The four electrodes 306 are respectively arranged at four sides of the vibrating membrane 308.

In the first carbon nanotube layer, each of the carbon nanotube structures 316 has a first end and a second end opposite to the first end. The first ends of the carbon nanotube structures 316 are connected with one electrode, and the second ends of the carbon nanotube structures 316 are connected with another electrode opposite to the electrode. Thus, the carbon nanotube structures 316 within the first carbon nanotube layer and the two electrodes 306 form parallel circuits. Similarly, the carbon nanotube structures 316 within the second carbon nanotube layer and other two electrodes 306 also form parallel circuits. In the present embodiment, the vibrating membrane 308 using the two carbon nanotube layers enhances the sensitivity of the pressure sensor 300.

Figure 6:
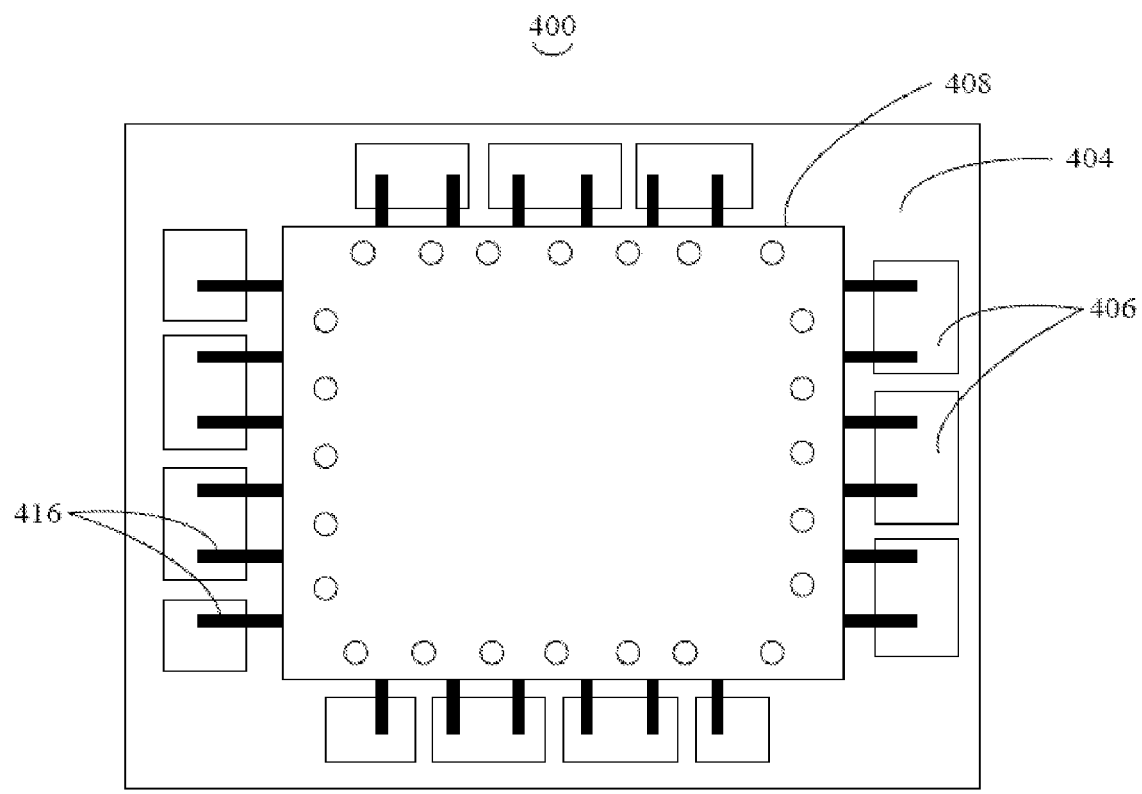
FIG. 6 is a top view of a micro-electro-mechanical pressure sensor, in accordance with a fourth present embodiment.

Referring to FIG. 6, a pressure sensor 400 is provided in the fourth present embodiment. The pressure sensor 400 is similar to the pressure sensor 200 in the second embodiment in that there is a plurality of electrodes 406. Further, the pressure sensor 400 is similar to the pressure sensor 300 of the third embodiment in that carbon nanotube structures 416 are arranged in two layers and in that the electrodes 406 are arranged at four sides of a dielectric isolation layer 404. The electrodes 406 at two opposite sides together with the carbon nanotube structures 416 of one layer are connected in daisy-chain fashion to form a series circuit, and the remaining electrodes 406 of the other two sides, together with the remaining layer of carbon nanotube structures, are connected in the same manner to form another series circuit. Other attributes of the present embodiment are the same as the previous embodiments. A vibrating membrane 408 using the two carbon nanotube layers enhances the sensitivity of the pressure sensor 400.

It is to be noted that the pressure sensors 200, 300, and 400 provided in the second, third, and fourth embodiments can also include a backboard 120, as provided in the first embodiment.

Figure 7:
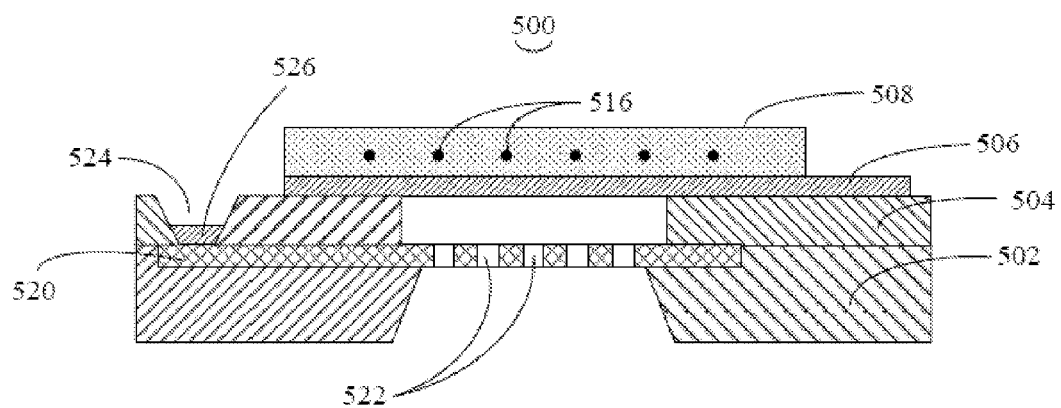
FIG. 7 is sectional, schematic view of a micro-electro-mechanical pressure sensor, in accordance with a fifth present embodiment.

Referring to FIG. 7, a pressure sensor 500 is provided in the fifth present embodiment. The pressure sensor 500 includes a substrate 502, a dielectric isolation layer 504, a backboard 520, a metal film 506, and a vibrating membrane 508. The vibrating membrane 508 includes a plurality of carbon nanotube structures 516. The carbon nanotube structures 516 in the present embodiment are carbon nanotubes. The dielectric isolation layer 504 is formed on the substrate 502. A backboard 520 is sandwiched between the substrate 502 and the dielectric isolation layer 504. The metal film 506 and the vibrating membrane 508 are formed on the dielectric isolation layer 504.

Further, the dielectric isolation layer 504 includes an etched hole 524 configured for exposing a part of the backboard 520. An electrode 526 is formed on the backboard 520. The exposed part of the backboard 520 is electrically connected to the electrode 526. The backboard 526 includes a plurality of acoustic holes 522.

Understandably, the backboard 520 and the vibrating membrane 508, in combination, constitute a capacitor. When the vibrating membrane 508 receives a change of pressure, the capacitance of the capacitor changes accordingly. A pressure sensor function is achieved by electrically detecting the change in capacitance. Moreover, another pressure sensor function is obtained by electrically detecting the change in resistance of the carbon nanotube structures 516. The two pressure sensor functions can serve to eliminate effects of environmental factors, such as temperature. The two pressure sensors may be combined into one electrical circuit to enhance the electrical signals created by the pressure change, thereby improving sensitivity of the pressure sensor 500. Understandably, the carbon nanotube structures 516 are connected with the electrodes (not shown), as in any of the above-described manners of the first, second, third, and fourth embodiments.

Figure 8:
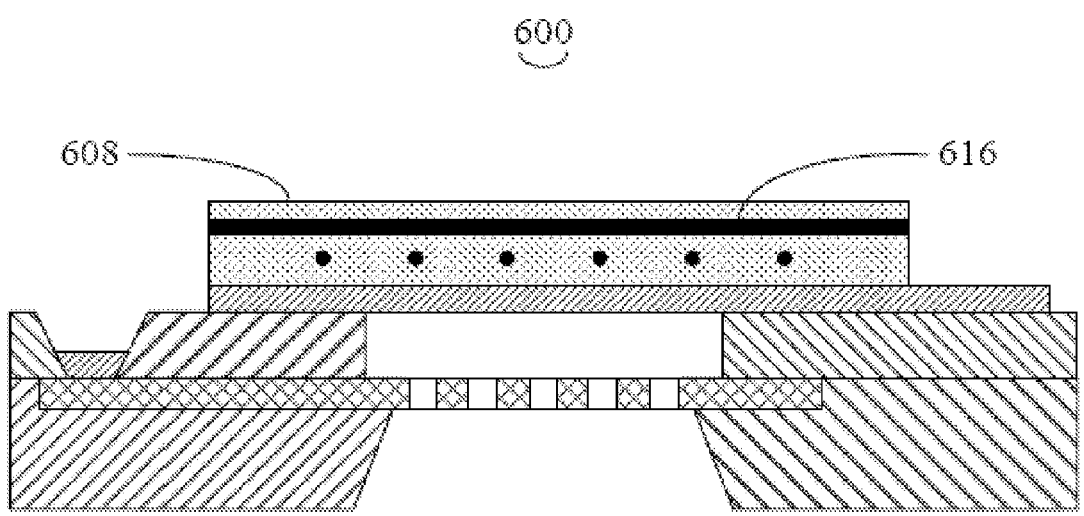
FIG. 8 is sectional, schematic view of a micro-electro-mechanical pressure sensor, in accordance with a sixth present embodiment.

Referring to FIG. 8, a pressure sensor 600 is provided in the sixth present embodiment. The pressure sensor 600 is similar to the pressure sensor 500 in the fifth present embodiment. The vibrating membrane 608 includes a plurality of carbon nanotube structures 616. However, unlike the fifth embodiment, the carbon nanotube structures 616 are separately parallel arranged, thereby forming a first carbon nanotube layer and a second carbon nanotube layer overlapped on the first carbon nanotube layer. Carbon nanotube structures 616 in each of the carbon nanotube layers are arranged in one direction. Each given pair of carbon nanotube layers are arranged at an angle α, and α is the angle between the two arranged directions. In the present embodiment, the angle α is 90 degrees, and the carbon nanotube structures 616 in the two overlapped carbon nanotube layers are insulatively arranged in the vibrating membrane 608. It is to be understood, however, that the angle α can be in the approximate range from 0° to 90°. The carbon nanotube structures 616 are connected with the electrodes (not shown), such as the case in the above-described first, second, third, and fourth embodiments.

A pressure sensor (not shown) is provided in a seventh embodiment. The pressure sensor is similar to the above-described pressure sensor. But, the vibrating membrane includes a plurality of super-aligned arrays of carbon nanotubes or other arrays of carbon nanotubes. Each of the arrays of carbon nanotubes includes a plurality of oriented carbon nanotubes. The oriented carbon nanotubes in all the arrays of carbon nanotubes are parallel to each other. Changes of pressure on the vibrating membrane cause deformation of the arrays of carbon nanotubes along an axis of the arrays of carbon nanotubes, thereby causing changes of resistance therein. The changes of resistance are detected by an external circuit, which is connected to the array of carbon nanotubes. As such, mechanical deformation of the vibrating membrane is changed into electrical signals. The electrical signals are output by the external circuit.

A pressure sensor (not shown) is provided in an eighth embodiment. The pressure sensor is similar to the above-described pressure sensor. In this embodiment, though, the carbon nanotube structures of the vibrating membrane are carbon nanotube films. The carbon nanotube films are separately arranged in parallel on a same plane. Each of the carbon nanotube films includes a plurality of carbon nanotube bundles. Each of the carbon nanotube bundles includes a plurality of carbon nanotubes arranged in a preferred orientation. Adjacent carbon nanotube bundles are combined by van der Waals attractive force to connect with each other. Quite suitably, the orientations of carbon nanotube bundles in all the carbon nanotube films are parallel. Changes of pressure on the vibrating membrane cause deformation of the carbon nanotube films along an axis of the carbon nanotube films, thereby causing changes of resistance therein. The changes of resistance are detected by an external circuit, which is connected to the carbon nanotube films. As such, mechanical deformation of the vibrating membrane is changed into electrical signals. The electrical signals are output by the external circuit.

The carbon nanotube films in the eighth embodiment are obtained by a method of pulling such from super-aligned arrays of carbon nanotubes. Thus, the carbon nanotube bundles are oriented along the pulling direction. The carbon nanotube films are directly arranged in parallel on an organic film, and then another organic film is covered on the carbon nanotube films, thereby forming the vibrating membrane.

The pressure sensors provided in the present embodiments include a plurality of carbon nanotube structures, thereby enhancing a compliance degree of the vibrating membrane. This improves the sensitivity of the pressure sensors. Moreover, the carbon nanotube structures with electrodes form a series circuit or a parallel circuit. Thus, it simplifies the circuit design and conveniently connects with different detecting circuits. It is to be understood that the vibrating membrane of the pressure sensors can advantageously sense the mechanical changes and transform these changes into electrical signal outputs. As such, the pressure sensors can be used in the field of acoustics or other areas, such as in mechanical fields.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A micro-electro-mechanical pressure sensor comprising:
    a substrate having an acoustic cavity;
    a dielectric isolation layer formed on the substrate, the dielectric isolation layer having a through hole corresponding to the acoustic cavity;
    at least two electrodes formed on the dielectric isolation layer; and
    a vibrating membrane formed on the dielectric isolation layer and covering the through hole, the vibrating membrane comprising at least one carbon nanotube structure, the at least one carbon nanotube structure, respectively, being electrically connected with the at least two electrodes.

2. The micro-electro-mechanical pressure sensor as claimed in claim 1, wherein each carbon nanotube structure is selected from the group consisting of a plurality of carbon nanotubes, an array of carbon nanotubes, and a carbon nanotube film.

3. The micro-electro-mechanical pressure sensor as claimed in claim 1, wherein the vibrating membrane is composed of at least two carbon nanotube structures, and the at least two carbon nanotube structures are arranged in a planar surface.

4. The micro-electro-mechanical pressure sensor as claimed in claim 3, wherein each of the at least two carbon nanotube structures has a first end and a second end opposite to the first end.

5. The micro-electro-mechanical pressure sensor as claimed in claim 4, wherein the first ends of the carbon nanotube structures are connected to a first electrode, and the second ends of the carbon nanotubes structures are connected to a second electrode.

6. The micro-electro-mechanical pressure sensor as claimed in claim 4, comprising at least three electrodes.

7. The micro-electro-mechanical pressure sensor as claimed in claim 6, wherein the first ends of adjacent carbon nanotube structures are connected to one electrode, and the second ends of the adjacent carbon nanotube structures are connected to the other two different electrodes.

8. The micro-electro-mechanical pressure sensor as claimed in claim 1, comprising at least four electrodes.

9. The micro-electro-mechanical pressure sensor as claimed in claim 8, wherein the vibrating membrane is composed of at least two carbon nanotube structures, the at least two carbon nanotube structures being configured for arranging in two different and parallel planar surfaces, the carbon nanotube structures in different planar surfaces being insulated from each other.

10. The micro-electro-mechanical pressure sensor as claimed in claim 9, wherein two ends of the carbon nanotube structure in a planar surface are respectively connected to two electrodes, and the carbon nanotube structures in the planar surface are parallel and disposed in one arranged direction.

11. The micro-electro-mechanical pressure sensor as claimed in claim 10, wherein arranged directions of carbon nanotube structures in adjacent planar surfaces are formed with an angle α, and the angle α is in the approximate range from 0° to 90°.

12. The micro-electro-mechanical pressure sensor as claimed in claim 1, wherein the vibrating membrane comprises a plurality of holes formed thereon.

13. The micro-electro-mechanical pressure sensor as claimed in claim 1, further comprising a backboard, the backboard being sandwiched between the dielectric isolation layer and the substrate.

14. The micro-electro-mechanical pressure sensor as claimed in claim 13, wherein the backboard further comprises a plurality of acoustic holes formed therein, each such acoustic hole cooperatively associates with a respective through hole of the dielectric isolation layer.

15. The micro-electro-mechanical pressure sensor as claimed in claim 14, further comprising a metal film, the metal film being configured for being sandwiched between the vibrating membrane and the dielectric isolation layer.

16. The micro-electro-mechanical pressure sensor as claimed in claim 15, further comprising an etched hole formed in the dielectric isolation layer, and an additional electrode is inserted in the etched hole.

17. The micro-electro-mechanical pressure sensor as claimed in claim 1, wherein the vibrating membrane further comprises two organic films, and the carbon nanotube structures are inserted between the organic films.

18. The micro-electro-mechanical pressure sensor as claimed in claim 17, wherein the material of the organic films is selected from a group consisting of polyamide and dichloro-[2,2]-paracyclophane.

19. The micro-electro-mechanical pressure sensor as claimed in claim 1, wherein the material of the substrate is selected from a group consisting of n-type silicon, p-type silicon, and intrinsic silicon.

20. The micro-electro-mechanical pressure sensor as claimed in claim 1, wherein the material of the dielectric isolation layer is selected form a group consisting of silicon dioxide and silicon nitride.

* * * * *